(12) United States Patent
Sato

(10) Patent No.: US 11,752,808 B2
(45) Date of Patent: Sep. 12, 2023

(54) PNEUMATIC TIRE

(71) Applicant: Sumitomo Rubber Industries, Ltd., Kobe (JP)

(72) Inventor: Yohei Sato, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/694,000

(22) Filed: Mar. 14, 2022

(65) Prior Publication Data

US 2022/0305849 A1 Sep. 29, 2022

(30) Foreign Application Priority Data

Mar. 25, 2021 (JP) .................... 2021-052199

(51) Int. Cl.
*B60C 15/06* (2006.01)
*B60C 15/04* (2006.01)
(Continued)

(52) U.S. Cl.
CPC ............ *B60C 15/04* (2013.01); *B60C 15/024* (2013.01); *B60C 15/06* (2013.01);
(Continued)

(58) Field of Classification Search
CPC . B60C 15/06; B60C 15/0603; B60C 15/0607; B60C 15/0628; B60C 15/0632;
(Continued)

(56) References Cited

U.S. PATENT DOCUMENTS 5,107,915 A * 4/1992 Shimomura ............ B60C 15/06
152/546
2010/0032071 A1* 2/2010 Miyazaki ................ C08L 15/00
152/525

(Continued)

FOREIGN PATENT DOCUMENTS

EP 2 910 391 A1 8/2015
EP 3 156 256 A1 4/2017
(Continued)

OTHER PUBLICATIONS

Machine Translation: JP-2005193868-A, Yugawa N, (Year: 2023).*
(Continued)

*Primary Examiner* — Kendra Ly
(74) *Attorney, Agent, or Firm* — Birch, Stewart, Kolasch & Birch, LLP

(57) ABSTRACT

A pneumatic tire comprises: a tread portion; a pair of sidewall portions; a pair of bead portions each with a bead core embedded therein; a toroidal carcass extending between the bead portions; and a sidewall rubber disposed axially outside the carcass in each of the sidewall portions. The bead portion has a bead bottom surface which contacts with a bead seat of a wheel rim when the tire is mounted thereon. The bead bottom surface comprises an axially inner region including a bead toe and an axially outer region including a bead heel. The axially inner region is formed by a canvas chafer. The axially outer region is formed by the sidewall rubber extended radially inwardly from the sidewall portion.

17 Claims, 2 Drawing Sheets

(51) Int. Cl.
*B60C 15/024* (2006.01)
*B60C 13/00* (2006.01)

(52) U.S. Cl.
CPC ...... *B60C 15/0603* (2013.01); *B60C 15/0628* (2013.01); *B60C 2013/006* (2013.01); *B60C 2013/007* (2013.01); *B60C 2015/0614* (2013.01); *B60C 2015/0617* (2013.01)

(58) Field of Classification Search
CPC .......... B60C 15/0635; B60C 15/06353; B60C 2015/061; B60C 2015/0614; B60C 2015/0617; B60C 2015/0621; B60C 2015/0625; B60C 2015/0639; B60C 2015/0642; B60C 2015/0646; B60C 2015/065; B60C 2015/0657; B60C 2015/066; B60C 2015/0664; B60C 2015/0667; B60C 2015/0671; B60C 2015/0675; B60C 2015/0678; B60C 2015/0682; B60C 2015/0685; B60C 2015/0689; B60C 2015/0692; B60C 2015/0696
See application file for complete search history.

(56) References Cited

U.S. PATENT DOCUMENTS

2015/0283865 A1* 10/2015 Ueda .................. B60C 15/06
  152/543
2020/0023690 A1* 1/2020 Tomita ............... B60C 15/0607

FOREIGN PATENT DOCUMENTS

| EP | 3 196 055 A1 | 7/2017 | |
| EP | 3 936 353 A1 | 1/2022 | |
| JP | 2684202 B2 * | 12/1997 | .......... B60C 15/024 |
| JP | 2005193868 A * | 7/2005 | |
| JP | 2015-199465 A | 11/2015 | |

OTHER PUBLICATIONS

Machine Translation: JP-2684202-B2, Iwamura K, (Year: 2023).*
Extended European Search Report for European Application No. 22161280.7, dated Aug. 10, 2022.

* cited by examiner

PNEUMATIC TIRE

BACKGROUND OF THE INVENTION

Field of the Invention

The present disclosure relates to a pneumatic tire, more particularly to a bead structure.

Background Art

When a pneumatic tire mounted on a wheel rim is used under severe running conditions, for example used in car racing, where high torque acts on the wheels due to powerful acceleration and/or braking, there is a possibility that slippage occurs between bead portions of the tire and bead seats of the wheel rim (hereinafter referred to as "tire/rim slippage").

Conventionally, in order to suppress such tire/rim slippage, the bottom surfaces of the bead portions are formed by a so called chafer or clinch rubber having a specific rubber composition (see, Patent Document 1 below).

Patent Document 1: Japanese Patent Application Publication No. 2015-199465

SUMMARY OF THE INVENTION

Problems to be Solved by the Invention

On the other hand, when a pneumatic tire is mounted on a wheel rim, the bead toe, namely, the axially inner end of the bottom surface of the bead portion is liable to make strong contact with the rim flange and applied by a large force. This is particularly true in a pneumatic tire for car racing whose lateral stiffness is increased. Therefore, in a pneumatic tire in which the bottom surfaces of the bead portions are formed from a relatively hard rubber (chafer or clinch rubber), there is a possibility that the bead toe is chipped off when the tire is mounted on a wheel rim. This may reduce the air sealing effect.

The present disclosure was made in view of the above situation, and a primary objective of the present disclosure is to provide a pneumatic tire in which the tire/rim slippage under severe running conditions can be suppressed, while preventing damage to the bead toe at the time when the tire is mounted on a wheel rim.

Means for Solving the Problems

According to the present disclosure, a pneumatic tire comprises: a tread portion; a pair of sidewall portions; a pair of bead portions each with a bead core embedded therein; a toroidal carcass extending between the bead portions; and a sidewall rubber disposed axially outside the carcass in each of the sidewall portions,
wherein
  each of the bead portions has a bead bottom surface coming into contact with a bead seat of a wheel rim when the tire is mounted thereon,
  the bead bottom surface comprises an axially inner region including a bead toe and an axially outer region including a bead heel,
  the axially inner region is formed by a canvas chafer, and the axially outer region is formed by the sidewall rubber extended radially inwardly from the sidewall portion.

DETAILED DESCRIPTION OF THE INVENTION

An embodiment of the present disclosure will now be described in detail in conjunction with accompanying drawings.

Figure 1:
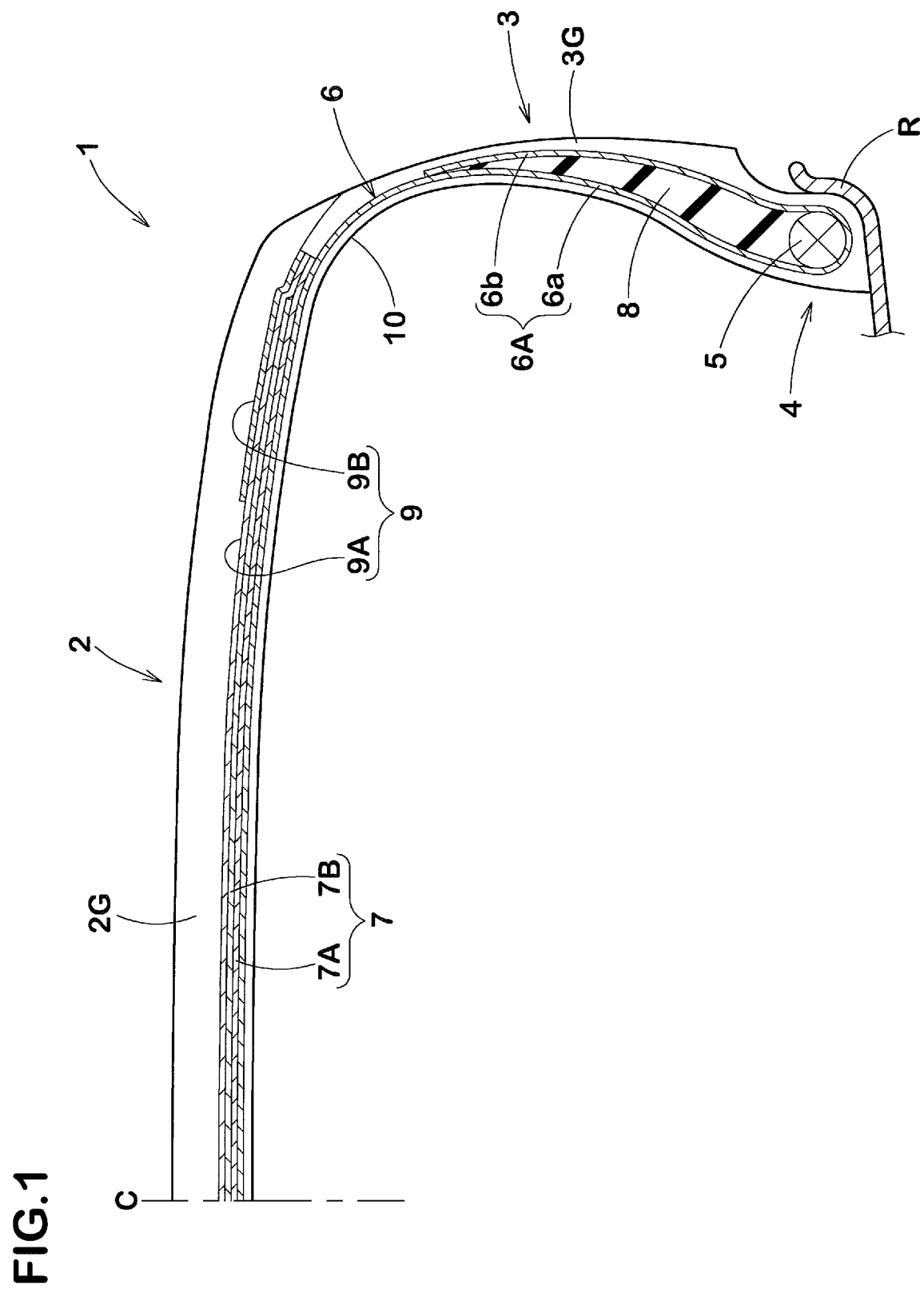
FIG. 1 is a cross-sectional view showing a pneumatic tire as an embodiment of the present disclosure.

FIG. 1 shows a pneumatic tire as an embodiment of the present disclosure which is under its normal state.

In the present application, the "normal state" of a tire means a state of the tire which is mounted on a normal wheel rim R, and inflated to a normal internal pressure, and loaded with no tire load.

In the present application, dimensions, positions and the like relating to a tire refer to those under the above-mentioned normal state of the tire unless otherwise noted.

In the present application, the "normal wheel rim" is a wheel rim specified for the tire by a standard included in a standardization system on which the tire is based, for example, the "normal wheel rim" in JATMA, "Design Rim" in TRA, and "Measuring Rim" in ETRTO.

In the present application, the "normal inner pressure" is air pressure specified for the tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The tire 1 comprises: a tread portion 2 having a pair of tread edges; a pair of axially spaced bead portions 4 each with a bead core 5 embedded therein; and a pair of sidewall portions 3 extending from the tread edges to the bead portions 4. The tire 1 is provided with an inner liner 10 made of an air-impermeable rubber compound and disposed along the tire inner surface. Although FIG. 1 shows only a part of the tire 1 on one side of the tire equator C, the part on the other side has the same structure as the one side.

In the present embodiment, the tire 1 is designed for racing cars used under severe running conditions, for example, running on a race circuit.

When such a tire for racing cars does not have standards established therefor like regular tires on the market, a wheel rim and internal pressure with which the running performance of the tire will be most appropriately exhibited, are determined as the normal wheel rim and normal internal pressure, respectively. At that time, recommended values by the tire manufacturer and the race regulations may be taken into consideration.

As another embodiment of the present disclosure, the tire 1 may be formed as a pneumatic tire for passenger cars, light trucks and the like.

The tire 1 is provided with a toroidal carcass 6 extending between the bead portions 4 through the tread portion 2 and the sidewall portions 3, and a tread-reinforcing belt 7 disposed radially outside the carcass 6 in the tread portion 2.

The carcass 6 is composed of one or more carcass plies 6A of carcass cords coated with a topping rubber.

In the present embodiment, the carcass cords in each ply 6A are arranged at an angle in a range from 80 to 90 degrees with respect to the tire equator C. For example, an organic fiber cord is preferably used as the carcass cords.

The carcass ply 6A is extended between the bead portions 4 through the tread portion 2 and the sidewall portions 3, and turned up around the bead core 5 in each of the bead portions from the inside to the outside of the tire so as to form a pair of turnup portions 6b and a main portion 6a therebetween. In this embodiment, each of the bead portions 4 is provided with a bead apex 8 made of a hard rubber compound. The bead apex 8 extends radially outwardly from the bead core 5 between the turnup portion 6b and the main portion 6a.

The belt 7 is composed of a plurality of belt plies, in this embodiment, only two cross plies 7A and 7B, and each ply 7A, 7B is made of parallel steel cords arranged at an angle in a range from 15 to 40 degrees with respect to the tire equator C. Such belt 7 increases the stiffness of the tread portion 2.

In the present embodiment, the tread portion 2 is further provided with a band 9 on the radially outside of the belt 7. The band 9 is composed of at least one ply of a cord or cords arranged at an angle of at most 5 degrees with respect to the tire circumferential direction in order to provide tight hoop effect for the carcass 6.
As to the band cords, an organic fiber cord is preferably used.

In the present embodiment, the band 9 has a so-called jointless structure in which the band cord or cords are spirally wound in the tire circumferential direction plural times.
Further, in the present embodiment, the band 9 is composed of
 a full-width band ply 9A which covers the substantially entire axial width of the belt 7, and
 a pair of axially spaced edge band plies 9B which respectively cover the axially outer edge portions of the belt 7.

The band 9 having such structure prevents lifting or expansion of the tread portion 2 at high speed tire rotation, and improves the durability and steering stability during high-speed running.

The tread portion 2 is provided with a tread rubber 2G on the radially outside of the band 9 in the present embodiment. The tread rubber 2G is disposed to form at least the tire tread or the radially outer surface of the tread portion 2.

In each of the sidewall portions 3, a sidewall rubber 3G is disposed axially outside the carcass 6.
In order to maintain the flexibility of the sidewall portions 3 during running, the sidewall rubber 3G is made of a relatively soft rubber compound.

The sidewall rubber 3G extends in the tire radial direction along the carcass 6, and the radially outer end thereof is spliced to the tread rubber 2G, and the radially inner end thereof is extended to the bead portion 4, as detailed later.

Figure 2:
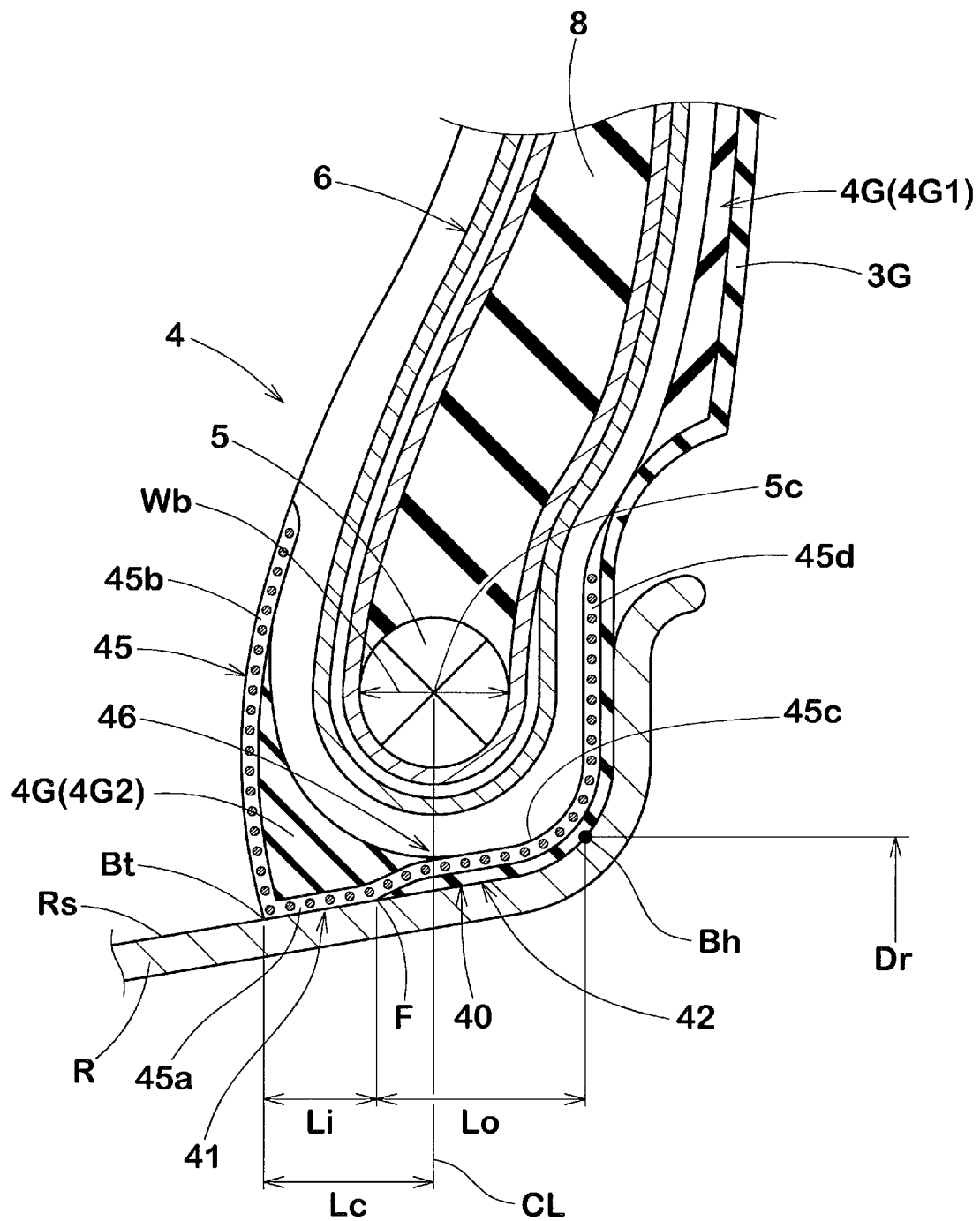
FIG. 2 is a cross-sectional view of a bead portion of the pneumatic tire.

As shown in FIG. 2, the bead portion 4 has a bottom surface 40 which comes into contact with a bead seat Rs of a wheel rim R when the tire 1 is mounted thereon.

In this application, the bead seat Rs means a portion, which extends axially inwardly from a position in the rim width direction corresponding to the rim diameter Dr as shown in FIG. 2, and which supports the bead portion 4 from the inside in the tire radial direction.

The bead bottom surface 40 is made up of an axially inner region 41 including the bead toe Bt, and an axially outer region 42 including the bead heel Bh.

The bead toe Bt means the axially innermost end of the bead bottom surface 40. The bead heel Bh means the position on the bead bottom surface 40 corresponding to the rim diameter Dr.

The axially inner region 41 is formed by a canvas chafer 45.
The axially outer region 42 is formed by the sidewall rubber 3G extended radially inwardly from the sidewall portion 3.

Thus, in the bead bottom surface 40, there is formed a boundary F between the canvas chafer 45 and the sidewall rubber 3G.

The canvas chafer 45 is a rubberized canvas, and provides an excellent resistance to external injury to the bead bottom especially bead toe as compared with a so-called rubber chafer made of rubber alone.

In the present embodiment, the axially inner region 41 of the bead bottom surface 40 is formed by the canvas chafer 45, therefore, the damage to the bead toe Bt at the time when the tire is mounted on a wheel rim or the like can be suppressed. Therefore, in the tire 1 of the present embodiment, the deterioration of the air sealing effect due to the damage of the bead toe Bt can be suppressed.

On the other hand, as compared with the rubber chafer, the canvas chafer 45 tends to have a smaller contact area with the bead seat Rs of the wheel rim R because the canvas is partially exposed or almost exposed and the amount of deformation of the canvas chafer 45 is small.
This is not preferable from the view point of preventing the tire/rim slippage. In the present embodiment, therefore, the sidewall rubber 3G which is made of a relatively soft rubber compound, is used to form the axially outer region 42 of the bead bottom surface 40. Thereby, the axially outer region 42 of the bead bottom surface 40 becomes in close contact with the bead seat Rs of the wheel rim R owing to a compression deformation of the relatively soft sidewall rubber 3G, and the contact area with the bead seat Rs is relatively increased.

The coefficient of friction of rubber is pressure-dependent.
The sidewall rubber 3G positioned at the bead bottom surface 40 has the increased contact area with the bead seat Rs and uniform pressure distribution, and increases the coefficient of friction between the bead bottom surface 40 and the bead seat Rs to generate a large frictional force.

As described above, in the tire 1 according to the present embodiment, the axially inner region 41 of the bead bottom surface 40 is provided with the canvas chafer 45 having an excellent resistance to external injury, and the axially outer region 42 of the bead bottom surface 40 is provided with the sidewall rubber 3G capable of generating a large frictional force between the sidewall rubber 3G and the bead seat Rs. As a result, the damage of the bead toe Bt at the time when the tire is mounted on a wheel rim can be suppressed, and at the same time, the tire/rim slippage under severe running conditions can be suppressed.

Further, in the tire 1 according to the present embodiment, since the sidewall rubber 3G is extended to the axially outer region 42, it is not necessary to use an additional rubber member for solving the above-mentioned problem. Therefore, the tire 1 can be manufactured without increasing the manufacturing process and the number of component parts.

It is preferable that the dimension Li in the tire axial direction of the axially inner region 41 is not less than 2 mm, more preferably not less than 3 mm in order to more effectively derive the above-mentioned effect of suppressing the tire/rim slippage under severe running conditions while suppressing damage to the bead toe Bt at the time when the tire is mounted on the wheel rim.

On the other hand, when the dimension Li in the tire axial direction of the axially inner region 41 becomes increased, as the dimension Lo in the tire axial direction of the axially outer region 42 becomes decreased, there is a possibility that the effect of suppressing the tire/rim slippage under severe running conditions is reduced.

From this point of view, it is preferred that the axial dimension Li of the axially inner region 41 is set to be not more than Lc+0.5 Wb, more preferably less than Lc+0.5 Wb, wherein "Lc" is the distance in the tire axial direction from the bead toe Bt to the centroid 5c of the bead core 5, and "Wb" is the dimension in the tire axial direction of the bead core 5 as shown in FIG. 2.

It is preferable that the sidewall rubber 3G exists in a position radially inside the bead core 5 (specifically, a region, of which axial extent corresponds to the axial dimension Wb of the bead core 5, and which is positioned exactly radially inside the bead core 5) since the contact pressure with the bead seat Rs of the wheel rim R is high in such position.

For example, the above-mentioned boundary F between the canvas chafer 45 and the sidewall rubber 3G is preferably located in the position radially inside the bead core 5.

It is particularly preferable that the sidewall rubber 3G exists at a position exactly radially inside the centroid 5c of the bead core 5, since the contact pressure with the bead seat Rs of the wheel rim R becomes highest at this position. As a result, the effect of suppressing the tire/rim slippage is further enhanced.

[Example of Canvas Chafer]

The canvas chafer 45 in this example comprises:

a first portion 45a extending axially outwardly from the bead toe Bt along the axially inner region 41; and a second portion 45b extending radially outwardly from the bead toe Bt along the tire inner surface facing the tire cavity. Such canvas chafer 45 can reinforce the bead toe Bt from the radially inside and the axially inside, therefore, the damage to the bead toe Bt when the tire is mounted on the wheel rim is more reliably prevented.

The canvas chafer 45 may comprise a third portion 45c overlapped with the sidewall rubber on the radially outside thereof in the axially outer region 42. The third portion 45c is continuous from the first portion 45a. The third portion 45c effectively transmits the tightening force of the bead core 5 to the sidewall rubber 3G located radially inside the bead core 5, which helps to further increase the frictional force between the axially outer region 42 and the bead seat Rs.

The canvas chafer 45 may further comprise a fourth portion 45d continuous from the third portion 45c and extending radially outward.

The fourth portion 45d in this example extends in the tire radial direction between the sidewall rubber 3G and the carcass 6.

Such fourth portion 45d can increase the bending rigidity of the bead portion 4, and also allows the sidewall rubber 3G to be brought into close contact with the rim flange. Thus, the tire/rim slippage can be further suppressed.

[Sidewall Rubber]

It is preferable that the sidewall rubber 3G has a complex elastic modulus of not more than 10 MPa, more preferably not more than 8 MPa, still more preferably not more than 6 MPa.

Such sidewall rubber 3G at the bead bottom surface 40 can be sufficiently compressed and deformed on the bead seat Rs when the tire is mounted on the wheel rim, and a high frictional force occurs between the bead bottom surface 40 and the bead seat Rs. Therefore, the tire/rim slippage can be suppressed more effectively.

On the other hand, if the complex elastic modulus of the sidewall rubber 3G becomes excessively small, then the amount of deformation of the sidewall rubber 3G in the axially outer region 42 during running becomes large, which may lead to deterioration of steering stability.

From this point of view, it is preferred that the complex elastic modulus of the sidewall rubber 3G is not less than 2 MPa, more preferably not less than 3 MPa, still more preferably not less than 4 MPa.

In this application, the complex elastic modulus is measured under the following conditions (temperature 100 degrees C., initial strain 5%, dynamic strain 1%, frequency 10 Hz, measuring mode tensile, and sample dimensions 20×4×1 mm (length×width×thickness)), using a dynamic viscoelasticity measuring device (EPLEXOR manufactured by GABO).

In the case that the object to be measured is the sidewall rubber 3G, the measuring sample is took out from the sidewall rubber 3G so that the length direction of the sample coincides the tire circumferential direction.

In the axially outer region 42 of the bead bottom surface 40, the thickness of the sidewall rubber 3G is preferably set in a range from 0.5 to 2.0 mm. By setting the thickness of the sidewall rubber 3G to 0.5 mm or more, it is possible to obtain a sufficient region where compression deformation in the tire radial direction occurs in the sidewall rubber 3G, and a high frictional force with the bead seat Rs can be obtained. Further, by setting the thickness of the sidewall rubber 3G to 2.0 mm or less, excessive deformation of the sidewall rubber 3G in the axially outer region 42 is suppressed, and deterioration of the steering stability is prevented. Here, the thickness of the sidewall rubber 3G is measured in the direction orthogonal to the bead bottom surface 40.

[Clinch Rubber]

Each of the bead portions 4 may be provided with a clinch rubber 4G having a complex elastic modulus larger than that of the sidewall rubber 3G. The clinch rubber 4G may include a first clinch rubber 4G1 disposed in the bead portion 4 between the sidewall rubber 3G and the carcass 6.

The first clinch rubber 4G1 is arranged from the sidewall portion 3 to the bead portion 4 in order to increase the bending rigidity of such portions of the tire. Therefore, the tire 1 can exhibit excellent steering stability for a racing car tire.

Further, the clinch rubber 4G may include a second clinch rubber 4G2 disposed on the radially outside of the canvas chafer 45 in the axially inner region 41. The second clinch rubber 4G2 is arranged adjacently to the first portion 45a and the second portion 45b of the canvas chafer 45. Such second clinch rubber 4G2 effectively reinforces the bead portion 4 in the vicinity of the bead toe Bt and prevents damage to the bead toe Bt.

The complex elastic modulus of the clinch rubber 4G is not particularly limited as long as it is larger than the complex elastic modulus of the sidewall rubber 3G.

However, in order to derive the effect of preventing tire/rim slippage without impairing the high-speed steering stability of the tire 1, it is preferable to provide a difference between the rigidity of the axially inner region 41 and the rigidity of the axially outer region 42 by relating to each other. Specifically, the ratio (E*s/E*c) of the complex elastic modulus E*s of the sidewall rubber 3G to the complex elastic modulus E*c of the clinch rubber 4G is preferably set to be not more than 0.20.

On the other hand, if the ratio (E*s/E*c) becomes excessively small, it becomes difficult to achieve both the high-speed steering stability and the effect of preventing tire/rim slippage.

From this point of view, the ratio (E*s/E*c) is preferably not less than 0.10.

[Compression]

It is desirable that the compression of the bead bottom is 10% to 16% in a portion 46 radially inside the bead core 5. Here, the compression of the bead bottom is determined by measuring the thickness in the tire radial direction from the bead core 5 to the bead bottom surface 40 before and after the tire is mounted on a wheel rim, and then dividing the thickness after the tire is mounted by the thickness before the tire is mounted.

For convenience, the above-mentioned thickness may be measured on a straight line CL extending in parallel with the tire radial direction through the centroid 5c of the bead core 5.

Since the coefficient of static friction of rubber is pressure dependent as described above, the frictional force can be maximized by optimizing the pressure in the above-mentioned portion 46 radially inside the bead core 5. As a result of various experiments made on the basis of the bead structure of the tire 1 according to the present disclosure, it was found that, when the compression is in the range from 10% to 16%, the frictional force between the bead bottom surface 40 and the bead seat Rs becomes maximized, and a higher effect of suppressing the tire/rim slippage can be obtained.

While detailed description has been made of a preferable embodiment of the present disclosure, the present disclosure can be embodied in various forms without being limited to the illustrated embodiment.

Comparison Tests

Based on the structures shown in FIGS. 1 and 2, pneumatic tires for racing cars were experimentally manufactured as test tires (Working example tire Ex., and Comparative example tires Ref.1 and Ref.2) and tested for the bead-toe damage resistance, steering stability, and tire/rim slippage resistance. The comparative example tire Ref.1 was the same as the working example tire except that the entire bead bottom surface was formed by a canvas chafer, and the comparative example tire Ref.2 was the same as the working example tire except that the entire bead bottom surface was formed by a rubber chafer.

[Bead-Toe Damage Resistance]

Mounting of the tire on a wheel rim and demounting of the tire from the wheel rim were repeated three times. Then, the bead portion including the bead toe was checked for the damage.

The results are indicated in Table 1 by using a score in which when there was no damage, the score is 100, and when there was damage, a point according to the degree of damage was subtracted from 100.

[Steering Stability]

The test tire was mounted on a wheel rim of size 18×13.0 J without applying a rim slippage prevention agent, and the tire was inflated to 180 kPa.

Such tire-rim assemblies were mounted on all wheels of a racing car (FIA GT3 category machine). Then, a professional driver run the racing car on a racing circuit course with full throttle open, and evaluated the steering stability. The results are indicated in Table 1 by a score, wherein the larger the number, the better the steering stability.

[Tire/Rim Slippage Resistance]

After the steering stability test was made, the amount of tire/rim slippage in the tire circumferential direction was measured. In order to measure the slippage, the rim and the tire were provided with markings at the same circumferential position in advance, and then the amount of circumferential displacement of those markings after running was measured.

The results are indicated in Table 1 by an index, wherein the larger the number, the better the resistance to tire/rim slippage.

TABLE 1

| tire | Ref. 1 | Ref. 2 | Ex. |
|---|---|---|---|
| bead bottom structure | canvas chafer | rubber chafer | FIG. 2 |
| Li (mm) | — | — | 3 |
| Lo (mm) | — | — | 12 |
| Lc + 0.5 Wb | 8 | 8 | 8 |
| bead-toe damage resistance | 100 | 80 | 100 |
| steering stability | 100 | 80 | 100 |
| tire/rim slippage resistance | 60 | 95 | 100 |

As shown in Table 1, it was confirmed that, in the working example tire according to the present disclosure, the damage of the bead toe at the time when the tire was mounted on the wheel rim was prevented, while suppressing the tire/rim slippage under severe running conditions as compared with the comparative example tires 1 and 2.

Further, pneumatic tires (Working examples Ex.1 to Ex.8) according to the present disclosure were prepared by changing specifications as shown in Table 2, and subjected to the same tests as described above. The test results are shown in Table 2.

TABLE 2

| tire | Ex. 1 | Ex. 2 | Ex. 3 | Ex. 4 | Ex. 5 | Ex. 6 | Ex. 7 | Ex. 8 |
|---|---|---|---|---|---|---|---|---|
| bead bottom structure | FIG. 2 | FIG. 2 | FIG. 2 | FIG. 2 | FIG. 2 | FIG. 2 | FIG. 2 | FIG. 2 |
| Li (mm) | 3 | 1 | 10 | 3 | 3 | 3 | 3 | 3 |
| Lo (mm) | 12 | 14 | 5 | 12 | 12 | 12 | 12 | 12 |
| Lc + 0.5 Wb | 8 | 8 | 8 | 8 | 8 | 8 | 8 | 8 |
| sidewall rubber complex modulus E*s (MPa) | 5 | 5 | 5 | 5 | 2 | 20 | 5 | 5 |
| E*s/E*c | 0.10 | 0.10 | 0.10 | 0.20 | 0.10 | 0.10 | 0.10 | 0.10 |
| sidewall rubber thickness in axially outer region (mm) | 1.0 | 1.0 | 1.0 | 1.0 | 1.0 | 1.0 | 0.3 | 2.5 |
| bead-toe damage resistance | 100 | 90 | 100 | 100 | 100 | 100 | 100 | 100 |
| steering stability | 100 | 100 | 100 | 90 | 95 | 100 | 100 | 90 |
| tire/rim slippage resistance | 100 | 105 | 95 | 100 | 95 | 90 | 90 | 100 |

As shown in Table 2, it was confirmed that the tires Ex.1-Ex.8 according to the present disclosure exhibited good performances.

Furthermore, tire (Ex.9 to Ex.11) according to the present disclosure were prepared by changing the compression of the bead bottom and subjected to the same tests. The test results are shown in Table 3.

TABLE 3

| tire | Ex. 9 | Ex. 10 | Ex. 11 |
| --- | --- | --- | --- |
| bead bottom structure | FIG. 2 | FIG. 2 | FIG. 2 |
| compression (%) | 12 | 8 | 20 |
| bead-toe damage resistance | 100 | 100 | 90 |
| steering stability | 100 | 100 | 100 |
| tire/rim slippage resistance | 100 | 75 | 90 |

As shown in Table 3, it was confirmed that the tires Ex.9-Ex.11 according to the present disclosure exhibited good performances.

Statement of the Present Disclosure

The present disclosure is as follows.

Disclosure 1: A pneumatic tire comprising: a tread portion; a pair of sidewall portions; a pair of bead portions each with a bead core embedded therein; a toroidal carcass extending between the bead portions; and a sidewall rubber disposed axially outside the carcass in each of the sidewall portions, wherein
  each of the bead portions has a bead bottom surface which contacts with a bead seat of a wheel rim when the tire is mounted thereon,
  the bead bottom surface comprises an axially inner region including a bead toe and an axially outer region including a bead heel,
  the axially inner region is formed by a canvas chafer, and
  the axially outer region is formed by the sidewall rubber extended radially inwardly from the sidewall portion.

Disclosure 2: The pneumatic tire according to Disclosure 1, wherein the axially inner region has an axial dimension of not less than 2 mm.

Disclosure 3: The pneumatic tire according to Disclosure 1 or 2, wherein the axial dimension of the axially inner region is not more than Lc+0.5 Wb, wherein
  Lc is a distance in the tire axial direction between the bead toe and the centroid of the bead core, and
  Wb is a dimension in the tire axial direction of the bead core.

Disclosure 4: The pneumatic tire according to Disclosure 1, 2 or 3, wherein the canvas chafer comprises a first portion extending in the tire axial direction along the axially inner region, and a second portion extending radially outwardly from the bead toe.

Disclosure 5: The pneumatic tire according to any one of Disclosures 1 to 4, wherein the canvas chafer comprises a third portion overlapped with the sidewall rubber on the radially outside of the sidewall rubber in the axially outer region.

Disclosure 6: The pneumatic tire according to Disclosure 5, wherein the canvas chafer comprises a fourth portion extending radially outwardly from the third portion.

Disclosure 7: The pneumatic tire according to any one of Disclosures 1 to 6, wherein the sidewall rubber has a complex elastic modulus in a range from 2 to 10 MPa.

Disclosure 8: The pneumatic tire according to any one of Disclosures 1 to 7, wherein the sidewall rubber has a thickness in a range from 0.5 to 2.0 mm in the axially outer region.

Disclosure 9: The pneumatic tire according to any one of Disclosures 1 to 8, wherein each of the bead portions is provided with a clinch rubber having a complex elastic modulus larger than that of the sidewall rubber, and the clinch rubber includes a first clinch rubber arranged between the sidewall rubber and the carcass.

Disclosure 10: The pneumatic tire according to Disclosure 9, wherein the clinch rubber includes a second clinch rubber overlapped with the canvas chafer on the radially outside of the canvas chafer in the axially inner region.

Disclosure 11: The pneumatic tire according to any one of Disclosures 1 to 8, wherein each of the bead portions is provided with a clinch rubber having a complex elastic modulus larger than that of the sidewall rubber, and the clinch rubber includes a second clinch rubber overlapped with the canvas chafer on the radially outside of the canvas chafer in the axially inner region.

Disclosure 12: The pneumatic tire according to Disclosure 9, 10 or 11, wherein the ratio ($E^*s/E^*c$) of a complex elastic modulus $E^*s$ of the sidewall rubber to a complex elastic modulus $E^*c$ of the clinch rubber is in a range from 0.10 to 0.20.

Disclosure 13: The pneumatic tire according to any one of Disclosures 1 to 12, wherein a bead compression is 10% to 16% when measured in a position radially inside the bead core

DESCRIPTION OF THE REFERENCE SIGNS 1 tire
2 tread portion
3 sidewall portion
3G sidewall rubber
4 bead portion
4G clinch rubber
4G1 first clinch rubber
4G2 second clinch rubber
5 bead core
40 bead bottom surface
41 axially inner region
42 axially outer region
45 canvas chafer
45a first portion
45b second portion
45c third portion
45d fourth portion
Bt bead toe
Bh bead heel
R wheel rim
Rs bead seat

The invention claimed is:

1. A pneumatic tire comprising: a tread portion; a pair of sidewall portions; a pair of bead portions each with a bead core embedded therein; a toroidal carcass extending between the bead portions; and a sidewall rubber disposed axially outside the carcass in each of the sidewall portions, wherein
  each of the bead portions has a bead bottom surface which contacts with a bead seat of a wheel rim when the tire is mounted thereon,
  the bead bottom surface comprises an axially inner region including a bead toe and an axially outer region including a bead heel,
  the axially inner region is formed by a canvas chafer, and
  the axially outer region is formed by the sidewall rubber extended radially inwardly from the sidewall portion,
  wherein
  the sidewall rubber extends from a position in the tire axial direction corresponding to a position in the tire axial direction of the centroid of the bead core to a position in the tire radial direction corresponding to a position in the tire radial direction of the outer end of the bead core, while having a substantially constant thickness, each of the bead portions is provided with a clinch rubber having a complex elastic modulus larger than that of the sidewall rubber,
the clinch rubber includes a first clinch rubber arranged between the sidewall rubber and the carcass, and
the canvas chafer comprises:
a first portion extending axially outwardly from the bead toe along the axially inner region,
a second portion extending radially outwardly from the bead toe along a tire inner surface facing a tire cavity,
a third portion extending from the first portion and overlapped with the sidewall rubber on the radially outside thereof in the axially outer region, and
a fourth portion extending radially outwardly from the third portion, and a radially outermost end of the fourth portion is positioned radially inner to a radially innermost end of the first clinch rubber.

2. The pneumatic tire according to claim 1, wherein the axially inner region has an axial dimension of not less than 2 mm.

3. The pneumatic tire according to claim 2, wherein the axial dimension of the axially inner region is not more than Lc+0.5 Wb, wherein
Lc is a distance in the tire axial direction between the bead toe and the centroid of the bead core, and
Wb is a dimension in the tire axial direction of the bead core.

4. The pneumatic tire according to claim 1, wherein an axial dimension of the axially inner region is not more than Lc+0.5 Wb, wherein
Lc is a distance in the tire axial direction between the bead toe and the centroid of the bead core, and
Wb is a dimension in the tire axial direction of the bead core.

5. The pneumatic tire according to claim 1, wherein the clinch rubber includes a second clinch rubber overlapped with the canvas chafer on the radially outside of the canvas chafer in the axially inner region.

6. The pneumatic tire according to claim 5, wherein
the second clinch rubber extends radially outwardly to a position in the tire radial direction corresponding to the centroid of the bead core and axially outwardly to a position in the tire axial direction corresponding the centroid of the bead core, while contacting with the canvas chafer, and
the second portion of the canvas chafer extends radially outwardly beyond the second clinch rubber.

7. The pneumatic tire according to claim 1, wherein a bead compression is 10% to 16% when measured in a position radially inside the bead core.

8. The pneumatic tire according to claim 7, wherein
the second clinch rubber extends radially outwardly to a position in the tire radial direction corresponding to the centroid of the bead core and axially outwardly to a position in the tire axial direction corresponding the centroid of the bead core, while contacting with the canvas chafer, and
the second portion of the canvas chafer extends radially outwardly beyond the second clinch rubber.

9. The pneumatic tire according to claim 1, wherein the sidewall rubber has a complex elastic modulus in a range from 2 to 10 MPa.

10. The pneumatic tire according to claim 9, wherein the ratio ($E^*s/E^*c$) of a complex elastic modulus $E^*s$ of the sidewall rubber to a complex elastic modulus $E^*c$ of the clinch rubber is in a range from 0.10 to 0.20.

11. The pneumatic tire according to claim 10, wherein
the second clinch rubber extends radially outwardly to a position in the tire radial direction corresponding to the centroid of the bead core and axially outwardly to a position in the tire axial direction corresponding the centroid of the bead core, while contacting with the canvas chafer, and
the second portion of the canvas chafer extends radially outwardly beyond the second clinch rubber.

12. The pneumatic tire according to claim 9, wherein the sidewall rubber has a thickness in a range from 0.5 to 2.0 mm in the axially outer region.

13. The pneumatic tire according to claim 12, wherein the clinch rubber includes a second clinch rubber overlapped with the canvas chafer on the radially outside of the canvas chafer in the axially inner region.

14. The pneumatic tire according to claim 13, wherein
the second clinch rubber extends radially outwardly to a position in the tire radial direction corresponding to the centroid of the bead core and axially outwardly to a position in the tire axial direction corresponding the centroid of the bead core, while contacting with the canvas chafer, and
the second portion of the canvas chafer extends radially outwardly beyond the second clinch rubber.

15. The pneumatic tire according to claim 12, wherein the ratio ($E^*s/E^*c$) of a complex elastic modulus $E^*s$ of the sidewall rubber to a complex elastic modulus $E^*c$ of the clinch rubber is in a range from 0.10 to 0.20.

16. The pneumatic tire according to claim 15 wherein
the second clinch rubber extends radially outwardly to a position in the tire radial direction corresponding to the centroid of the bead core and axially outwardly to a position in the tire axial direction corresponding the centroid of the bead core, while contacting with the canvas chafer, and
the second portion of the canvas chafer extends radially outwardly beyond the second clinch rubber.

17. The pneumatic tire according to claim 12, wherein in the axially outer region, the thickness of the sidewall rubber is substantially constant on the axially outer side of a position in the tire axial direction of the centroid of the bead core.

* * * * *